T. E. BROWN.
SLIDE DISPLAY MACHINE.
APPLICATION FILED MAY 29, 1916.
1,257,278.
Patented Feb. 19, 1918.
4 SHEETS—SHEET 4.
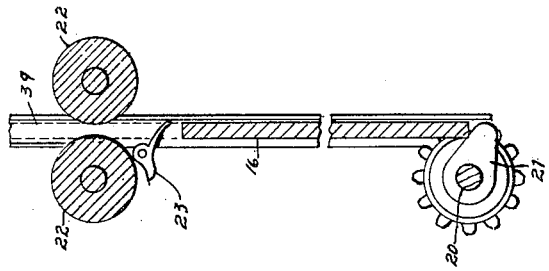
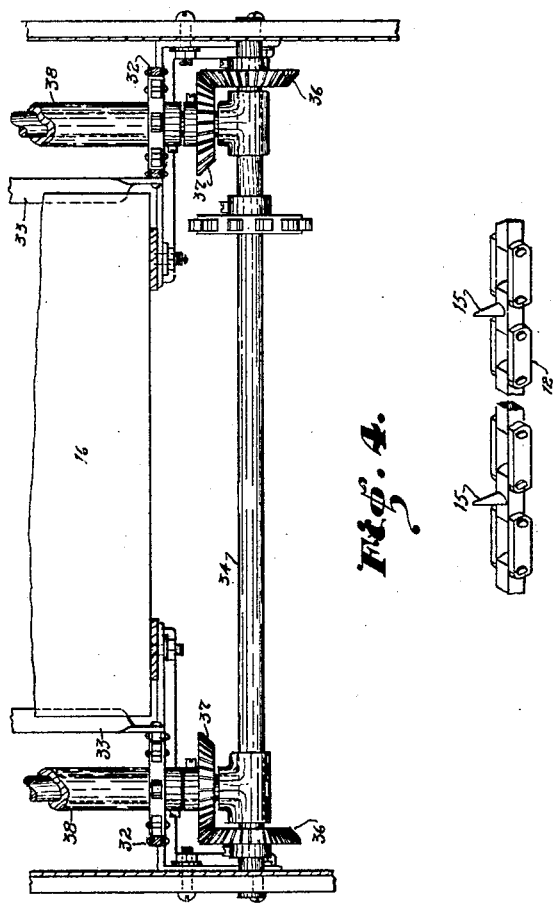
WITNESS:
J. E. Johnson
INVENTOR
T. E. Brown.
BY
John M. Spellman
ATTORNEY

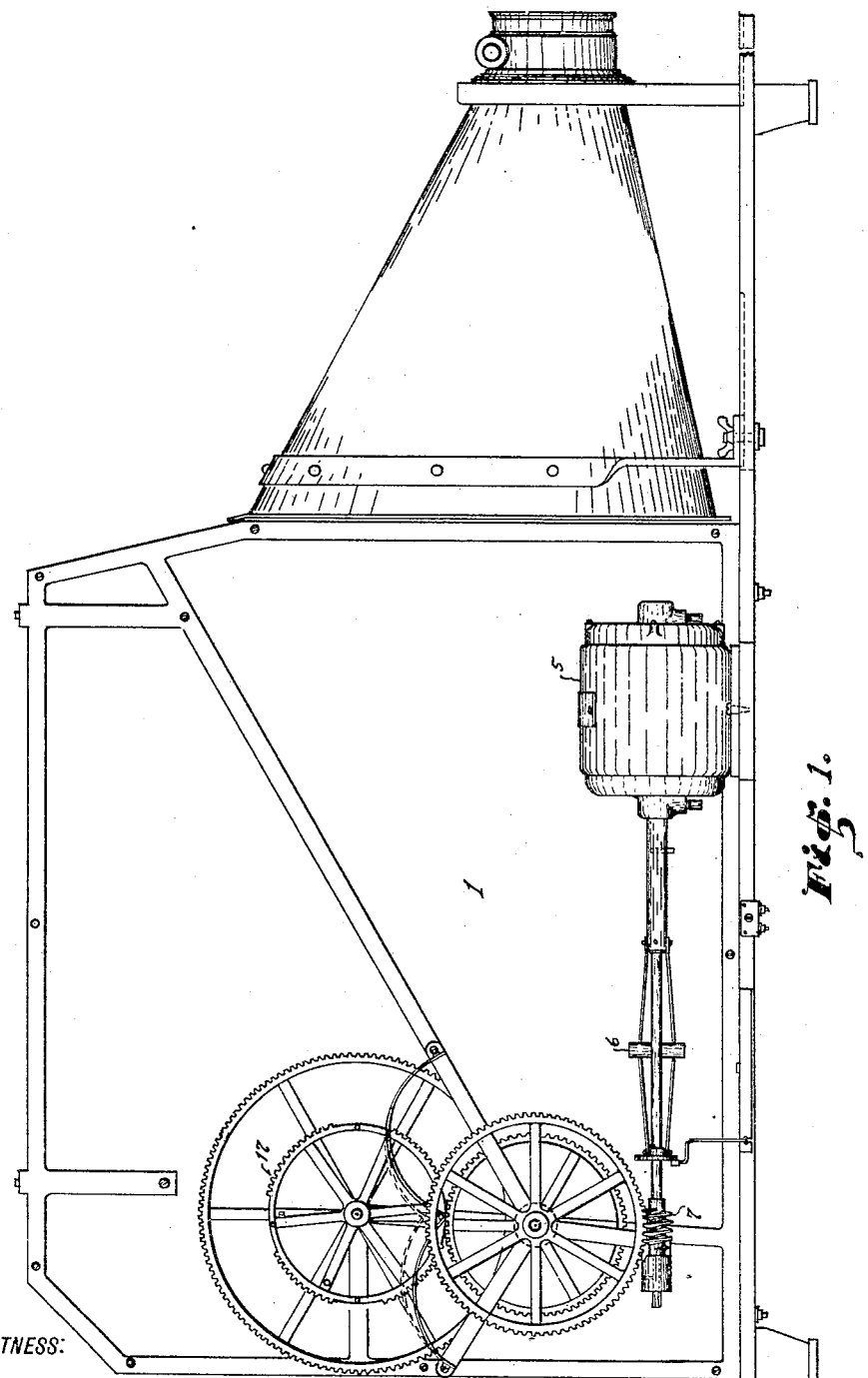

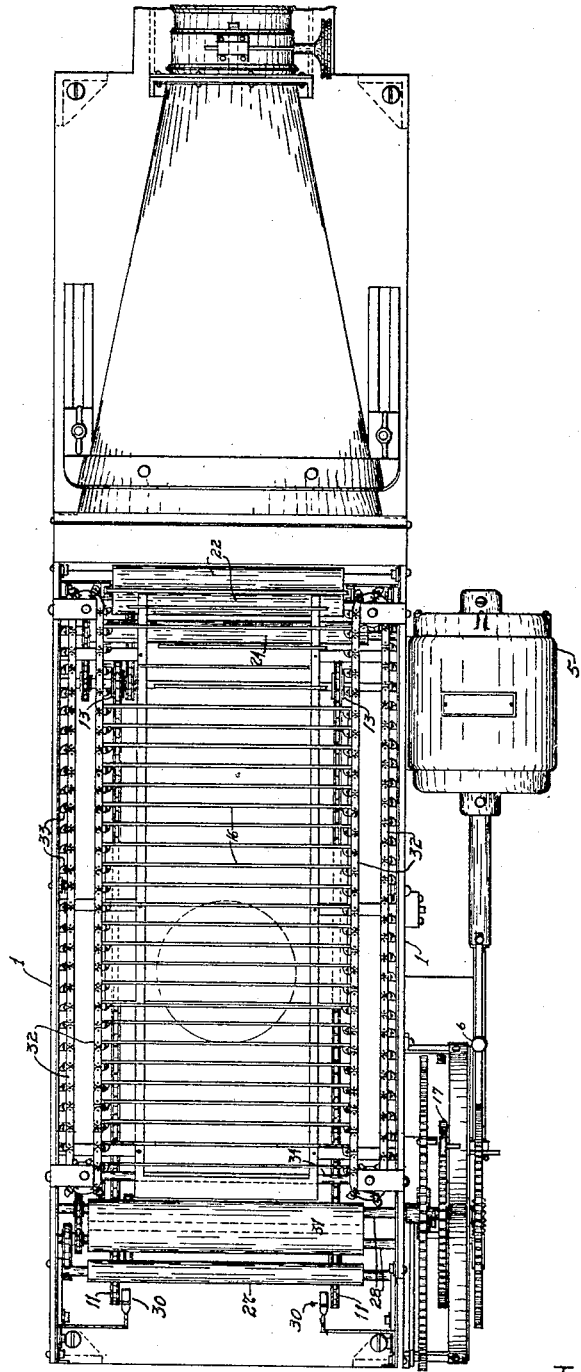

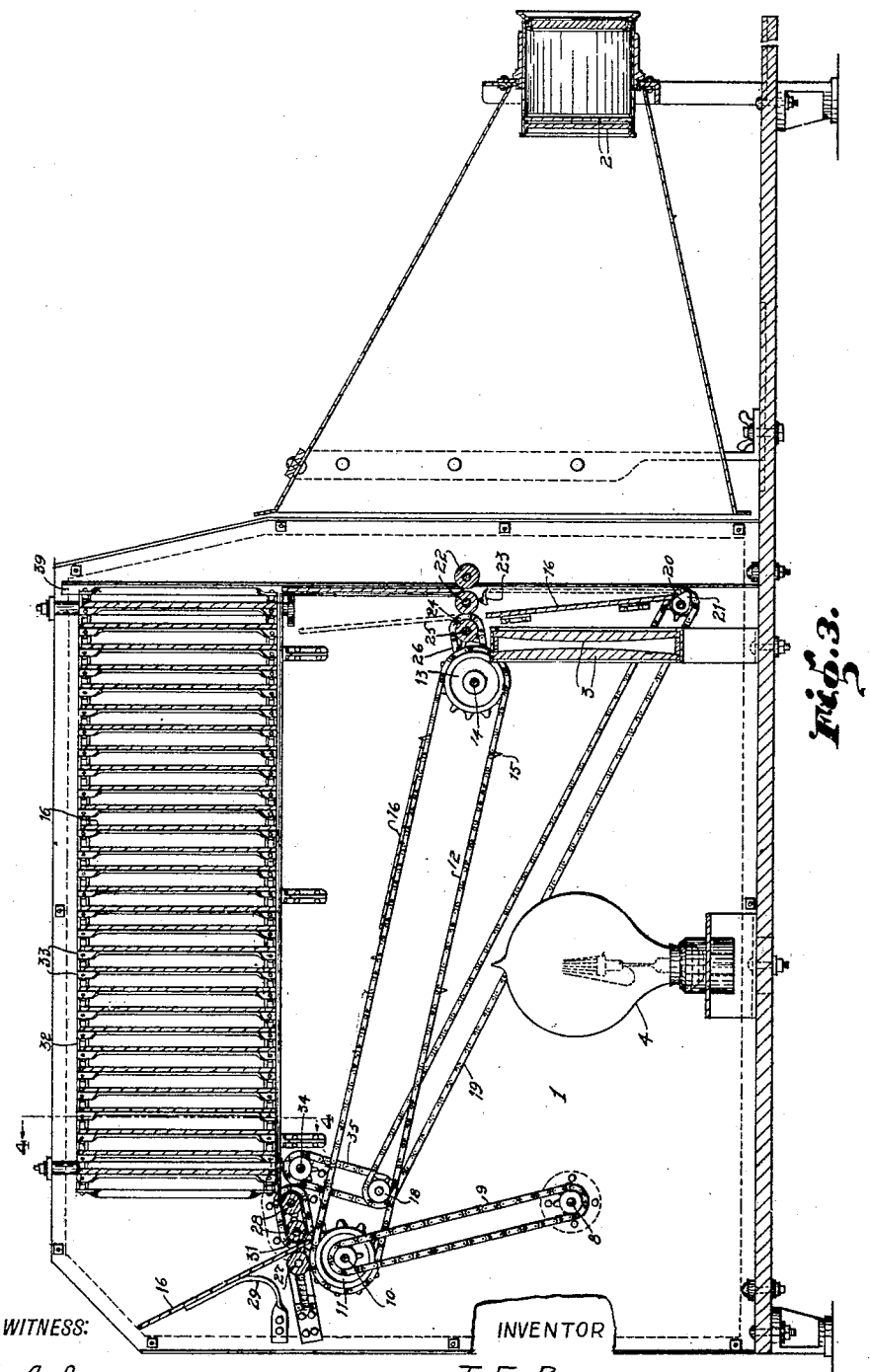

UNITED STATES PATENT OFFICE.

THOMAS E. BROWN, OF PECOS, TEXAS.

SLIDE-DISPLAY MACHINE.

1,257,278.  Specification of Letters Patent.  Patented Feb. 19, 1918.

Application filed May 29, 1916. Serial No. 100,516.

*To all whom it may concern:*

Be it known that I, THOMAS E. BROWN, a citizen of the United States, residing at Pecos, in the county of Reeves and State of Texas, have invented certain new and useful Improvements in Slide-Display Machines, of which the following is a specification.

My invention has relation to that type or class of display advertising machines known as slide display machines, which display upon a wall, sidewalk or screen, the matter carried by slides in the nature of magic lantern or stereopticon slides, and in such connection the invention relates more particularly to the construction and arrangement of the mechanism or means for moving the slides automatically through the machine to display each successively upon the wall or screen.

In carrying out my invention there is provided a series of slides each containing advertising matter, pictorial illustrations, photographs or the like and these slides are moved with a step by step movement and brought in front of the condensing lens and between the projecting lens and the source of light. A mechanism of simple construction thereafter returns each slide to the rear of the series of slides to be exhibited and to position where it may again be exhibited when moved to the front of the machine by the continuously operated mechanisms.

The nature and scope of my invention will be more fully understood from the following description taken in connection with the accompanying drawings forming part hereof, is which—

Figure 1, is a side elevational view of a stereopticon embodying the main features of my invention, Fig. 2, is a top or plan view thereof with the top or cover removed, Fig. 3, is a longitudinal sectional view of the machine, Fig. 4, is a vertical sectional view taken on the line 4—4 of Fig. 3, Fig. 5, is a detail view of the switch mechanism for directing each slide to the rear of the machine after said slide has been exhibited, and Fig. 6, is a detail perspective view of a portion of one of the conveyer chains.

Referring to the drawings 1, represents the frame work of the machine, 2 the projecting lens, 3 the condensing line and 4 a source of light within the frame work. On the exterior of the frame and supported thereby is an electric motor 5, having the usual governor 6 and operating through worm gear mechanism 7 of the usual well known type and arrangement, a main driving shaft 8 with the requisite continuous motion.

The main driving shaft 8 is connected by chain 9 with a second shaft 10 at the rear of the machine and this shaft 10 is provided with sprockets 11 each connected by sprocket chains 12 with sprockets 13 on shaft 14 arranged above the condensing lens 3. These chains 12 have at intervals (see Fig. 6) upwardly projecting lugs 15 and are designed to carry the slides 16 from a point in front of condensing lens 3 to the rear of the machine, said slides 16 lying flat upon the two chains.

The main driving shaft 8 also drives through mutilated gear mechanism 17 a shaft 18 with a periodic motion. This shaft 18 is connected by a pair of chains 19 with a shaft 20 carrying two cams 21 which are adapted as the shaft 20 rotates to strike upon the lower edge of a slide 16 in front of lens 3 and lift the same upward.

At the top of lens 3 and in front thereof are two rollers 22 between which a slide 16 passes to occupy the display position in front of lens 3. Below these rollers (see Figs. 3 and 5) is arranged a trigger 23 acting as a switch in permitting the downward movement of a slide but directing the slide in its upward movement to a traveling band or belt 24 extending from shaft 14 to shaft 25 adjacent to the rear of rollers 22. The cams 21 serve to direct a slide into engagement with the band or belt 24. This band 24 operates in conjunction with an adjacent roller 22 to elevate the slide above the band 24 until it tilts and falls down upon the chains 12. The shaft 25 is connected by a chain 26 with shaft 14 and receives its motion therefrom. The chains 12 deliver the slides received from band 24 to a means for withdrawing the slides from and elevating the same to a vertical position at the rear of the machine. This mechanism in its simplest form comprises a roller 27 co-acting with one of a pair of rollers 28 to direct the slide to an upwardly extending inclined position against a spring support 29 with its lower end resting on and guided by an apron 31 of the rollers 28. The rollers 28 are positively driven from shaft 10 and are inclosed by the band 31. The slides rest at their base on the endless band 31 which is arranged in conjunction with spring support 29 and inclined portion 30 of the framework to convey each slide 16 in an upright position to two sets of two sprocket chains 32 arranged in horizontal planes (see Fig. 4) and carrying the uprights 33 constituting frames or supports for supporting the slides at top and bottom and conveying the same through the upper part of the machine. A preferred means of operating the chains 32 is illustrated in Fig. 4. A shaft 34 driven by sprocket chain 35 from the periodically rotating shaft 18 carries the two miter gears 36 meshing with miter gears 37 on the vertically arranged shafts 38 to which the sprockets 37 for chains 32 are secured.

At the delivery end of the means for transporting the slides in upright position is arranged a guiding framework 39 leading to the rollers 22 in front of condensing lens 3. It will thus be seen that my machine comprises a combination of means or instrumentalities whereby the slides in series are fed by a step by step motion to a position in front of lens 3 to be displayed or projected through lens 2 and that thereafter the slides are successively lifted and placed in inclined horizontal position upon suitable carriers having a constant motion and conveyed to the rear of the machine and elevated to vertical position and presented to the rear of the slides in motion.

Having thus described the nature and objects of my invention, what I claim as new and desire to secure by Letters Patent, is—

1. In a machine of the character described, a condensing lens, a series of slides, a means for moving said slides with periodic movement to bring successive slides above and in front of said lens, two rollers arranged to guide each slide to a position directly in front of said lens, a switch arranged below said rollers, a continuously rotating conveyer arranged adjacent to said switch, a shaft and cams arranged to elevate each slide upward against said switch to direct the slide upon the continuously rotating conveyer.

2. In a machine of the character described, a condenser lens, a series of slides, a framework arranged to receive and retain successive slides in display position in front of said lens, a switch arranged at the top of said lens, a cam shaft arranged at the base of said lens, said switch and shaft coöperating to lift each slide successively from the display position and to incline said slide, and a continuously traveling conveyer arranged to receive and support the slide when said slide is brought to inclined position.

In testimony whereof I have signed my name to this specification.

THOMAS E. BROWN.

Copies of this patent may be obtained for five cents each, by addressing the "Commissioner of Patents, Washington, D. C."